April 18, 1961      A. C. STOVER      2,980,128
HYDRAULIC FLUID SYSTEM
Original Filed Dec. 22, 1952      2 Sheets-Sheet 1
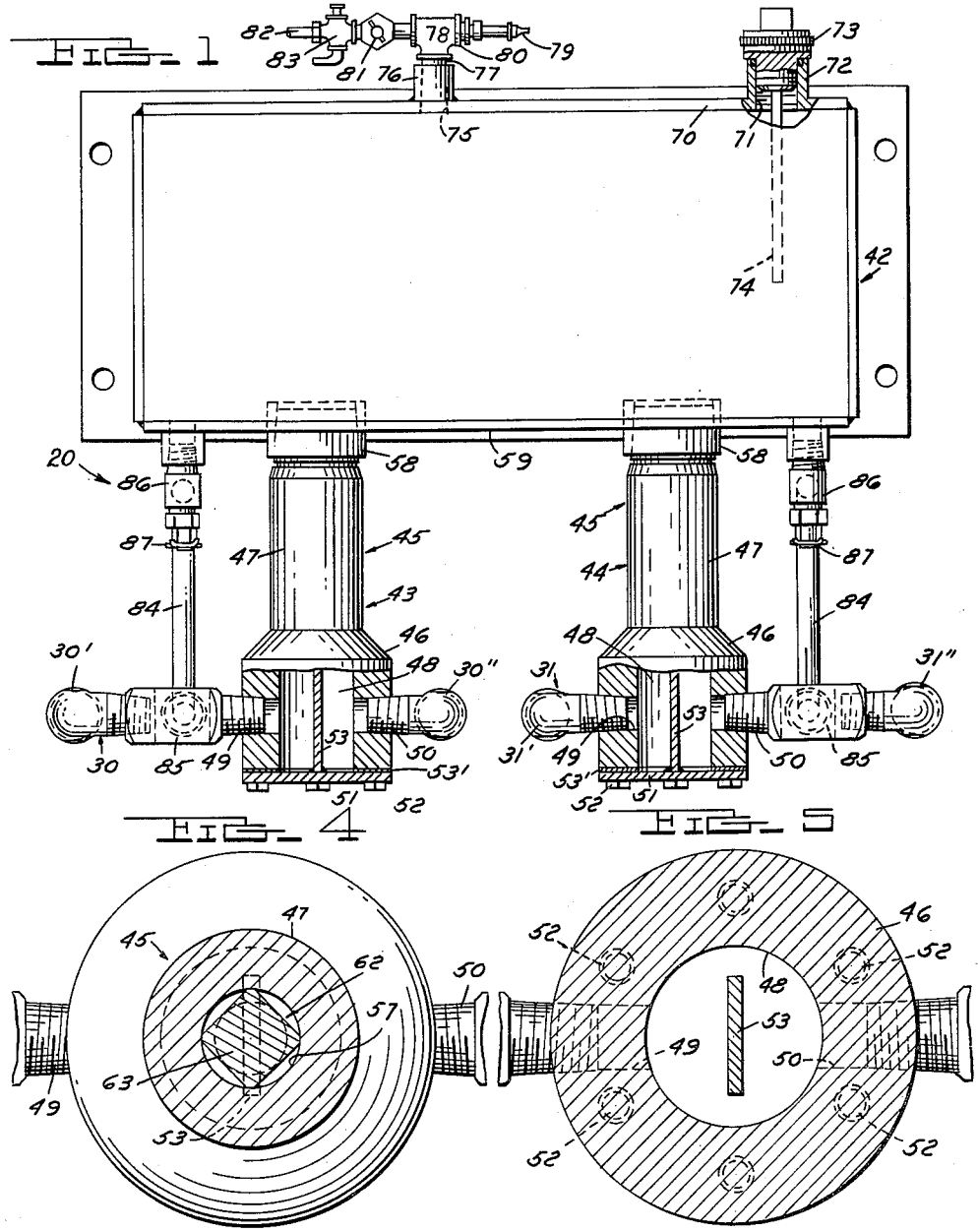
INVENTOR.
Ancil C. Stover
BY
Whittemore, Hulbert & Belknap
ATTORNEYS

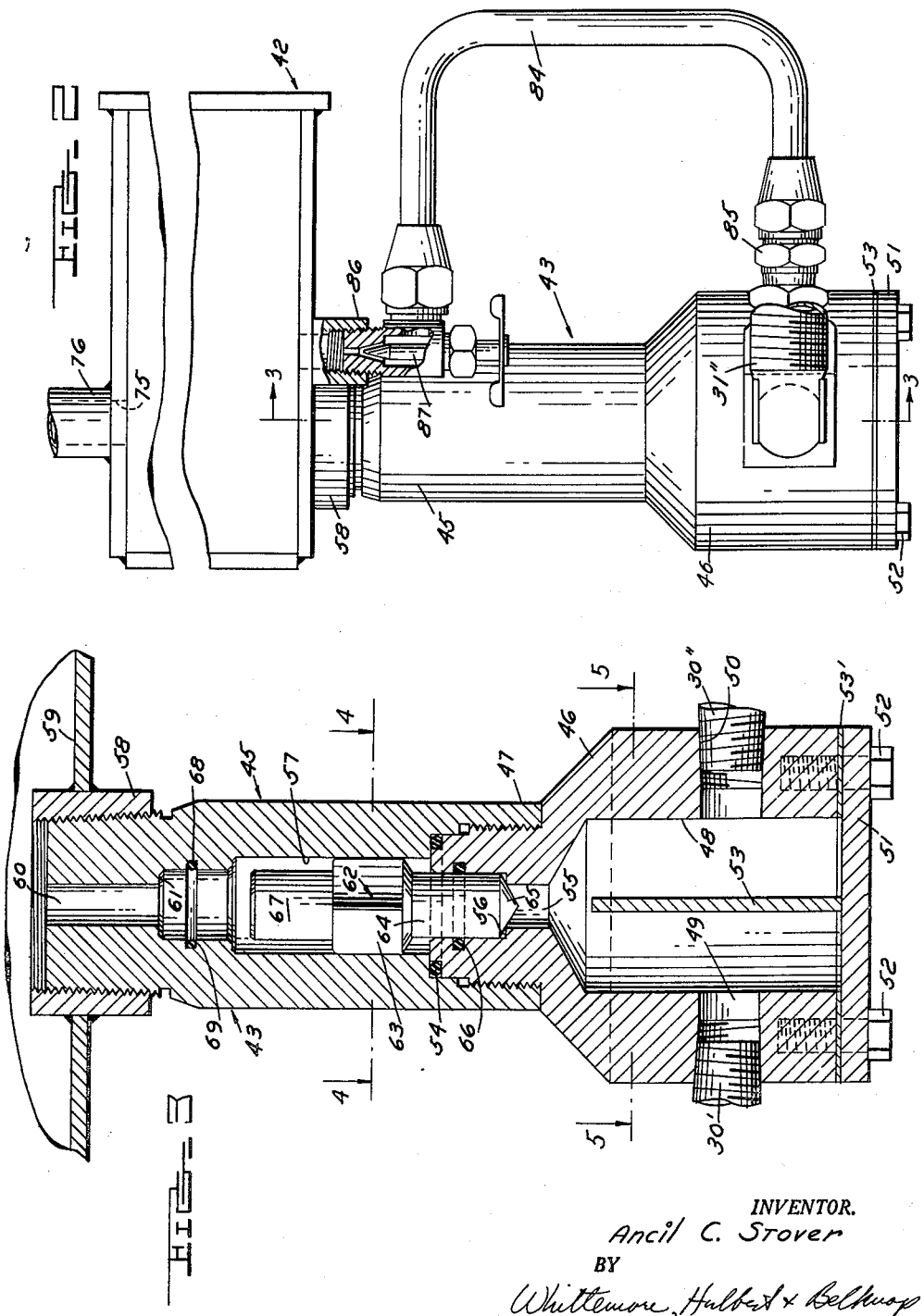

United States Patent Office 2,980,128
Patented Apr. 18, 1961

2,980,128

HYDRAULIC FLUID SYSTEM

Ancil C. Stover, Louisville, Ky., assignor to William A. Eisenhauer, William P. Ellwood, and Leigh E. Eisenhauer, copartners, doing business as The Eisenhauer Manufacturing Company, Van Wert, Ohio Original application Dec. 22, 1952, Ser. No. 327,231, now Patent No. 2,761,693, dated Sept. 4, 1956. Divided and this application May 28, 1956, Ser. No. 587,795

13 Claims. (Cl. 137—198)

This invention relates to a hydraulic system having provision for maintaining the system free of air and full of hydraulic fluid.

One object of the invention is to provide a hydraulic system having means for removing air that may accumulate in the system and replacing the air with hydraulic fluid so as to maintain the hydraulic system at all times free of air and full of hydraulic fluid.

The invention has a number of useful applications. For example, it may be used to advantage in hydraulic power steering apparatus or in hydraulic brake systems where it is desirable to obtain an accurate control which cannot be realized when air is present in the hydraulic system. The invention is highly useful in connection with vehicles of the type having tandemly arranged axles supported for turning movement about substantially vertically extending axes. In vehicles of the above type it is desirable to stabilize the action of the axles so that turning movement of one axle in one direction insures a turning movement of a second axle in the opposite direction throughout approximately the same angle of travel as the first axle. This can be done with a closed hydraulic system.

The effectiveness of a hydraulic displacement system for the above purposes depends largely on whether or not the system can be kept free of air throughout continued use. Any air or other compressible medium present in the hydraulic system could destroy the positive control necessary for successful operation.

With the above in view, it is an object of this invention to provide means for expelling all air from the hydraulic system and thereby assure the desired positive control. More particularly, the present invention contemplates connecting the hydraulic system to a reservoir through the medium of air aspirating valves. The aspirating valves are respectively connected in opposite sides of the system and are operated by momentary pressure differentials developed in the system to expel air from the latter into the reservoir and to replace the air with hydraulic fluid from the reservoir. In other words, the aspirating valves are operated when a predetermined increase in pressure over the normal pressure existing in the system occurs. Often an increase in pressure will result from displacement of hydraulic fluid. However, a pressure increase can occur as the result of other factors.

The foregoing, as well as other objects, will be made more apparent as this description proceeds, especially when considered in connection with the accompanying drawings, wherein:

Figure 1 is a side elevational view of a hydraulic system embodying my invention;

Figure 2 is an end elevational view of the construction shown in Figure 1 and having certain parts broken away for the purpose of clarity;

Figure 3 is an enlarged longitudinal sectional view through one of the air transfer valves shown in Figure 1, taken on line 3—3 of Fig. 2;

Figure 4 is a cross sectional view taken on the line 4—4 on Figure 3; and

Figure 5 is a cross sectional view taken on the line 5—5 of Figure 3.

The hydraulic system of my invention may be used with a vehicle of the general type shown in my copending applicaion, Ser. No. 119,222, filed October 3, 1949, now Patent No. 2,643,895. In Fig. 1 the hydraulic fluid system actually includes two closed sides or circuits respectively including the conduits 30 and 31.

In order to assure excluding air from the system 20 both sides 30 and 31 are respectively connected to the reservoir 42 by a pair of aspirating valves 43 and 44. As shown in Figure 3 of the drawings, the aspirating valve 43 has a body 45 formed of two parts 46 and 47. A receiving chamber 48 is formed in the bottom part 46 and diametrically opposed ports 49 and 50 extend through the side walls of the part 46. The port 49 is connected to one branch 30' of the fluid conduit 30 forming one side of the hydraulic displacement system 20 and the port 50 is connected to the other branch 30" of the fluid conduit 30. The lower end of the chamber is open and is normally closed by a removable cap 51 secured to the bottom of the part 46 by studs 52. A gasket 53' is interposed between the cap 51 and the bottom of the part 46 to prevent the escape of fluid from the chamber 48.

Inasmuch as the system 20 is completely filled with fluid, it follows that the chamber 48 is also filled with fluid and that displacement of fluid in the conduit or side 30 of the system 20 results in a movement of fluid through the chamber 48. Due to the velocity of flow of fluid through the conduit 30 during displacement, any air present in this side of the system tends to accumulate within the chamber 48 above the ports 49 and 50. This action is facilitated by providing the cap 51 with a baffle 53 which extends upwardly from the cap 51 into the chamber 48. As shown, in Figure 3 of the drawings the baffle 53 is centrally located in the chamber 48 midway between the ports 49 and 50 in a position such that fluid entering the chamber 48 through either of said ports is deflected by the baffle 53. The resulting opposition to flow of fluid directly from one port to the other assists air in the side 30 of the system to pass upwardly in the chamber 48 and become trapped at the top of the latter chamber.

Referring again to Figure 3 of the drawings, it will be noted that the top of the part 46 is reduced and is externally threaded to threadably engage the lower end of the body part 47. An O-ring type seal 54 is provided between the reduced portion of the part 46 and the adjacent inner surface of the part 47 to establish a fluid tight seal therebetween. The reduced portion of the part 46 has a vertically extending passage 55 centrally disposed with respect to the chamber 48 and reduced in diameter at the lower end to form an annular seat 56 intermediate the ends thereof. The upper end of the passage 55 opens into the bottom of a vertically extending circular transfer chamber 57 formed in the body part 47 and communicating with the interior of the reservoir 42. In detail, the upper end of the body part 47 is threaded into a coupling 58 which is located within an opening formed in the bottom wall 59 of the reservoir 42 and is welded or otherwise secured to the wall 59. A vertically extending passage 60 is formed in the upper end of the body part 47 and connects the transfer chamber 57 to the interior of the reservoir. The passage 60 is aligned with the passage 55 and is enlarged at the lower end to provide an annular seat 61 intermediate the ends thereof.

Supported within the chamber 57 for vertical sliding movement is a plunger 62 having an enlargement 63 intermediate the ends polygonally shaped in cross section, as shown in Figure 4 of the drawings. The corners of the enlargement 63 are rounded to have a bearing engagement with the inner surface of the chamber 57 and the faces of the enlargement between the corners cooperate with the inner surface of the chamber 57 to form vertical passages for fluid. The lower end 64 of the plunger 62 is shaped to have a sliding fit in the upper enlarged end of the vertical passage 55, and terminates in a conical end surface 65 adapted to engage the seat 56 in the normal or lowermost position of the valve plunger 62. An O-ring type seal 66 is supported within an annular groove formed in the inner surface of the passage 55 in a position to establish a fluid tight seal with the end 64 of the valve plunger 62 in its normal or lowermost position.

The upper portion 67 of the valve plunger 62 is shaped to have a sliding fit in the enlarged lower end of the vertical passage 60 and the upper end of the portion 67 is engageable with the annular seat 61 in the passage 60 to limit the extent of upward displacement of the plunger 62. An O-ring type seal 68 is supported within an annular groove 69 formed in the enlarged lower end of the passage 60 in a position to engage the upper end portion 67 of the valve plunger to establish a fluid tight seal.

The valve plunger 62 is in its normal position shown in Figure 3 when fluid in the side 30 of the system 20 is at normal pressure. In this normal position of the valve plunger 62, the lower end 64 projects into the passage 55 and the conical end 65 of the plunger engages the seat 56 to close communication between the receiving chamber 48 and the transfer chamber 57. Also in this normal position of the valve plunger 62, the upper portion 67 is spaced below the passage 60 to establish communication between the transfer chamber 57 and the interior of the reservoir 42.

When the valve plunger 62 is in the above-mentioned normal position and the pressure of the fluid in the conduit or side 30 of the system 20 increases by a predetermined amount over the normal pressure for any reason, an upward thrust is exerted on the valve plunger sufficient to overcome reservoir pressure and the drag of seal 66 to raise the latter to its uppermost position. The plunger may be designed to be raised in response to any desired predetermined pressure increase. Such a predetermined pressure increase will normally occur as a result of the displacement of hydraulic fluid in the conduit. As the valve plunger 62 moves to its uppermost position, the lower end 64 leaves the enlarged upper end of the passage 55 and the top portion 67 of the plunger projects into the enlarged lower end of the passage 60. Hence, the chamber 48 is open to communication to the transfer chamber 57 and communication between the latter and reservoir 42 is closed. Any air trapped in the chamber 48 passes upwardly through the passage 55 into the chamber 57 and is replaced by oil or non-compressible fluid previously admitted to the chamber 57 in the normal position of the valve plunger 62.

When the hydraulic system 20 returns to a condition of equilibrium, the valve plunger 62 returns to its normal or lowermost position allowing any air previously admitted to the chamber 57 to pass upwardly into the reservoir. It follows from the above that the aspirating valve 43 functions each time a predetermined pressure increase occurs in the system, which will result when fluid is displaced in the conduit or side 30 of the system 20, to expel any air that may be present in the side 30 of the system 20.

The valve plunger 62 is of such construction that in intermediate positions, the opposite ends of the plunger respectively remain in the passages 55 and 60 so that at no point in the stroke of the plunger 62 is it possible for hydraulic fluid to bypass the plunger. Thus, the volume of hydraulic fluid required to operate the plunger 62 cannot exceed the displacement of the valve plunger and this displacement is very small in comparison to the displacement of the pistons in the system 20. Consequently, very little movement of the pistons is required to actuate the valve plunger 62.

The aspirating valve 44 is identical in construction to the valve 43 and hence the same reference numerals are used to indicate corresponding parts of the two valves. It is to be noted, however, that the aspirating valve 44 connects the branches 31' and 31" of the conduit 31 forming the opposite side of the system 20. The operation of the aspirating valve 44 to expel air from the side 31 of the system upon predetermined pressure increases in the latter side of the system is the same as the operation of the valve 43 previously described.

Referring now more in detail to the reservoir 42, it will be noted that the top wall 70 is fashioned with an opening 71 through which hydraulic fluid may be introduced into the reservoir. A sleeve 72 is welded or otherwise suitably secured to the top wall 70 in alignment with the opening 71 and is internally threaded to threadably engage a cap 73. The cap 73 coacts with the upper end of the sleeve 72 to seal the interior of the reservoir from the atmosphere. The numeral 74 designates a suitable dip stick secured in any suitable manner at the upper end to the cap 73 and adapted to indicate the level of the hydraulic fluid within the reservoir 42.

The hydraulic fluid contained in the reservoir 42 is maintained under pressure somewhat above atmospheric and in order to accomplish this result air under pressure is introduced into the reservoir 42 through an opening 75 in the top wall 70. As shown in Figure 1 of the drawings, a sleeve 76 is welded or otherwise suitably secured to the top wall 70 in alignment with the opening 75 and is internally threaded at the upper end to receive a nipple 77. A pipe T 78 is secured to the nipple 77 and one outlet of the pipe T 78 is connected to an air inlet valve 79 through the medium of a nipple 80. The other outlet of the pipe T 78 is connected to an air supply line 82 through a pressure regulating valve 81 which is set to maintain the pressure within the reservoir 42 within the desired limits. Referring again to Figure 1 of the drawings, a shut-off valve 83 is shown in the air supply line to enable closing the latter when desired.

It is preferred to maintain the hydraulic fluid in the reservoir 42 under pressure above atmospheric in order to render the aspirating valves 43 and 44 more responsive to pressure changes in the system 20. Also, by pressurizing the system 20, the pressure in the latter is prevented from dropping below atmospheric pressure and hence any seals in the system will not be subjected to reversal of pressure. Thus, the tendency for air to leak into the system is reduced to a minimum and satisfactory operation is obtained even though the seals may become worn.

Referring again to Figures 1 and 2 of the drawings, it will be noted that provision is made for bypassing the aspirating valves during refilling of the reservoir 42. In detail, the receiving chamber 48 of each aspirating valve is connected to the lower end of a bypass line 84 by means of the coupling 85 and the upper end of each bypass line 84 is connected to the reservoir by a fitting 86. Each fitting 86 is provided with a shut-off valve 87 and this valve is closed during the normal operation of the stabilizing means. However, when it is desired to refill the system 20 with hydraulic fluid through the reservoir 42, the valves 87 are opened in order to vent air from the systems to the reservoir. The valves 87 are also useful for restoring volumetric balance to the system after refilling.

This application is a division of my copending application Ser. No. 327,231, filed December 22, 1952, now Patent No. 2,761,693, for "Stabilizing Means for Vehicle Steering Axles."

What I claim as my invention is:

1. A closed hydraulic displacement system including a fluid conductor adapted to be filled with hydraulic fluid, a reservoir containing a supply of hydraulic fluid, a valve having a receiving chamber in open communication with said conductor, an air transfer chamber in said valve connecting the receiving chamber to the reservoir at a point in the reservoir below the level of said hydraulic fluid supply, a valve member and seating structure therefor in said valve operable to close communication between said chambers and to open communication between the transfer chamber and said reservoir, thereby to displace air in said transfer chamber into said reservoir by hydraulic fluid from the latter, and means associated with said valve including said valve member operable in response to a predetermined increase of pressure in the fluid in said conductor to close communication between said transfer chamber and said reservoir and thereafter to open communication between said chambers for displacing air in said receiving chamber into said transfer chamber by hydraulic fluid from the latter.

2. A closed hydraulic displacement system including a conduit adapted to be filled with hydraulic fluid, a valve having a receiving chamber in open communication with said conduit, an air transfer chamber positioned in said valve above the receiving chamber in communication with the latter, a hydraulic fluid reservoir communicating with said transfer chamber, said transfer chamber and the point of communication between the fluid reservoir and the transfer chamber being below the level of the fluid in the reservoir, a valve plunger and seating structure therefor in said valve operable to close communication between said chambers and to open communication between said transfer chamber and said reservoir, thereby to displace air in said transfer chamber into said reservoir by hydraulic fluid from the latter and means associated with said valve including said valve plunger operable by displacement of fluid in said conduit to close communication between said transfer chamber and said reservoir and thereafter to open communication between said chambers for displacing air in said receiving chamber into said transfer chamber by hydraulic fluid from the latter.

3. A closed hydraulic displacement system including a fluid conductor adapted to be filled with hydraulic fluid, a reservoir containing a supply of hydraulic fluid, and a valve connecting said conductor to said reservoir, the connection between the reservoir and the valve being located below the level of said supply of hydraulic fluid, said valve having means included therewithin operable by the displacement of hydraulic fluid in said conductor for removing and transferring to said reservoir air accumulated in said conductor and for directly replacing the same with hydraulic fluid from said reservoir.

4. In a closed hydraulic displacement system including a fluid conductor adapted to be filled with hydraulic fluid, a reservoir containing a supply of hydraulic fluid, a valve having a passage connecting said conductor to said reservoir at a point in said reservoir below the level of said supply of hydraulic fluid, said valve having means operable to close communication between said passage and said conductor and to open communication between said passage and said reservoir, thereby to displace air in said passage into said reservoir by hydraulic fluid from the latter, and means operable in response to a predetermined increase of the pressure of the fluid in said conductor to close communication between said passage and said reservoir and thereafter to open communication between said passage and said conductor, for displacing air in said conductor into said chamber by hydraulic fluid from said reservoir.

5. A closed hydraulic displacement system including a fluid conductor adapted to be filled with hydraulic fluid, a reservoir containing a supply of hydraulic fluid, and a valve connecting said conductor to said reservoir at a point in said reservoir below the level of said supply of hydraulic fluid, said valve including means integral therewith operable in response to a predetermined increase of pressure in the hydraulic fluid in said conductor to remove and transfer to said reservoir air accumulated in said conductor and to replace the same with hydraulic fluid from said reservoir.

6. A closed hydraulic displacement system including a fluid conductor adapted to be filled with a relatively non-compressible fluid, a reservoir containing a supply of relatively non-compressible fluid, a valve comprising a receiving chamber in open communication with said conductor, an air transfer chamber positioned in said valve directly above said receiving chamber and communicating with the latter and with said reservoir, the communication between said receiving chamber and said reservoir being at a point in said reservoir below said supply of fluid, a vertically extending free floating valve plunger in said valve, seating structure for said valve plunger, means including said valve plunger and seating structure operable to close communication between said chambers and to open communication between said transfer chamber and said reservoir, thereby to displace air in said transfer chamber into said reservoir by hydraulic fluid from the latter, and means including said valve plunger and seating structure operable in response to a predetermined increase of pressure of hydraulic fluid in said conductor to close communication between said transfer chamber and said reservoir and thereafter to open communication between said chambers, for displacing air in said receiving chamber into said transfer chamber by hydraulic fluid from the latter.

7. A closed hydraulic displacement system including a fluid conductor adapted to be filled with a hydraulic fluid, a reservoir containing a supply of hydraulic fluid, a valve comprising a receiving chamber in open communication with said conductor, an air transfer chamber positioned in said valve directly above said receiving chamber and communicating with the latter and with said reservoir through spaced vertically aligned passages, a vertically extending free floating valve plunger in said transfer chamber of smaller cross-section than the latter, said valve plunger in one position thereof being positioned with its lower end projecting into the lower of said passages and with its upper end clear of the upper of said passages to close communication between said chambers and to open communication between said transfer chamber and said reservoir, thereby to displace air in said transfer chamber into said reservoir by hydraulic fluid from the latter, said valve plunger being movable upwardly from said one position thereof in response to a predetermined increase of pressure of hydraulic fluid in said conductor to an upper position with its upper end projecting into said upper passage and its lower end clear of said lower passage to open communication between said chambers and to close communication between said transfer chamber and said reservoir, thereby to displace air in said receiving chamber into said transfer chamber by hydraulic fluid from the latter, the length of said valve plunger being such that opposite ends thereof respectively project into the vertically aligned passages in an intermediate position of said plunger to prevent flow of fluid through said passages.

8. The structure defined in claim 7 comprising a baffle projecting upwardly from said receiving chamber in a position to direct fluid upwardly against the lower end of said valve plunger.

9. A closed hydraulic displacement system including a fluid conductor adapted to be filled with a hydraulic fluid, a reservoir containing a supply of hydraulic fluid, a valve comprising a receiving chamber in open communication with said conductor, an air transfer chamber in said valve communicating with said receiving chamber and with said reservoir through spaced aligned passages, a free floating valve plunger in said transfer chamber of smaller cross-section than the latter, said valve plunger being positionable with one end projecting into one of said passages connecting said transfer chamber with said receiving chamber and with its other end clear of the other of said passages to close communication between said chambers and to open communication between said transfer chamber and said reservoir, thereby to displace air in said transfer chamber into said reservoir by hydraulic fluid from the latter, said valve plunger being movable upwardly in said transfer chamber in response to a predetermined increase of pressure of hydraulic fluid in said conductor to a position with its other end projecting into said other passage and with its one end clear of said one passage, thereby to displace air in said receiving chamber into said transfer chamber by hydraulic fluid from the latter, the length of said valve plunger being such that both ends thereof project into the aligned passages in an intermediate position of said plunger to prevent the flow of hydraulic fluid through said passages.

10. The structure set forth in claim 9 in which said transfer chamber is located directly above said receiving chamber and said passages are vertically aligned.

11. A closed hydraulic displacement system adapted to be filled with hydraulic fluid, a reservoir containing a supply of hydraulic fluid, and a valve connecting said system to said reservoir, said valve including means within itself operable in response to a predetermined increase of pressure in the hydraulic fluid in said system for removing and transferring to said reservoir air accumulated in said system and replacing the same with hydraulic fluid from said reservoir.

12. Structure as claimed in claim 11 wherein the last mentioned means comprises a receiving chamber and a transfer chamber with said receiving chamber located below and in communication with said transfer chamber, said receiving chamber being in direct communication with the hydraulic system, said transfer chamber being in direct communication with and below said reservoir, and a valve plunger slidably received within said transfer chamber operable to prevent direct communication between the hydraulic system and reservoir.

13. Structure as claimed in claim 12 wherein said valve plunger is provided with sealing surfaces at both ends thereof and said transfer chamber is provided at both ends with recesses having sealing means therein which recesses are adapted to sealingly receive said ends of said plunger in the different operative positions of said plunger to seal the transfer chamber from the reservoir, the receiving chamber from the transfer chamber, and the receiving chamber and the reservoir from the transfer chamber.

References Cited in the file of this patent

UNITED STATES PATENTS

| | | |
|---|---|---|
| 1,005,686 | Brower | Oct. 10, 1911 |
| 1,119,980 | Mulligan | Dec. 8, 1914 |
| 1,633,463 | Sperry | June 21, 1927 |
| 1,775,362 | Demarcus | Sept. 9, 1930 |
| 1,873,396 | Hallenbeck | Aug. 23, 1932 |
| 2,255,676 | O'Reilly | Sept. 9, 1941 |
| 2,343,809 | Schnell | Mar. 7, 1944 |
| 2,529,306 | Morris | Nov. 7, 1950 |
| 2,624,176 | Osborne | Jan. 6, 1953 |
| 2,627,868 | Runnels | Feb. 10, 1953 |
| 2,684,684 | Stevenson | July 27, 1954 |